Nov. 29, 1949  I. J. REMARK  2,489,324
SPLICING APPARATUS
Filed Aug. 13, 1948  4 Sheets-Sheet 1

INVENTOR
Isidore J. Remark
BY
Evans + McCoy
ATTORNEYS

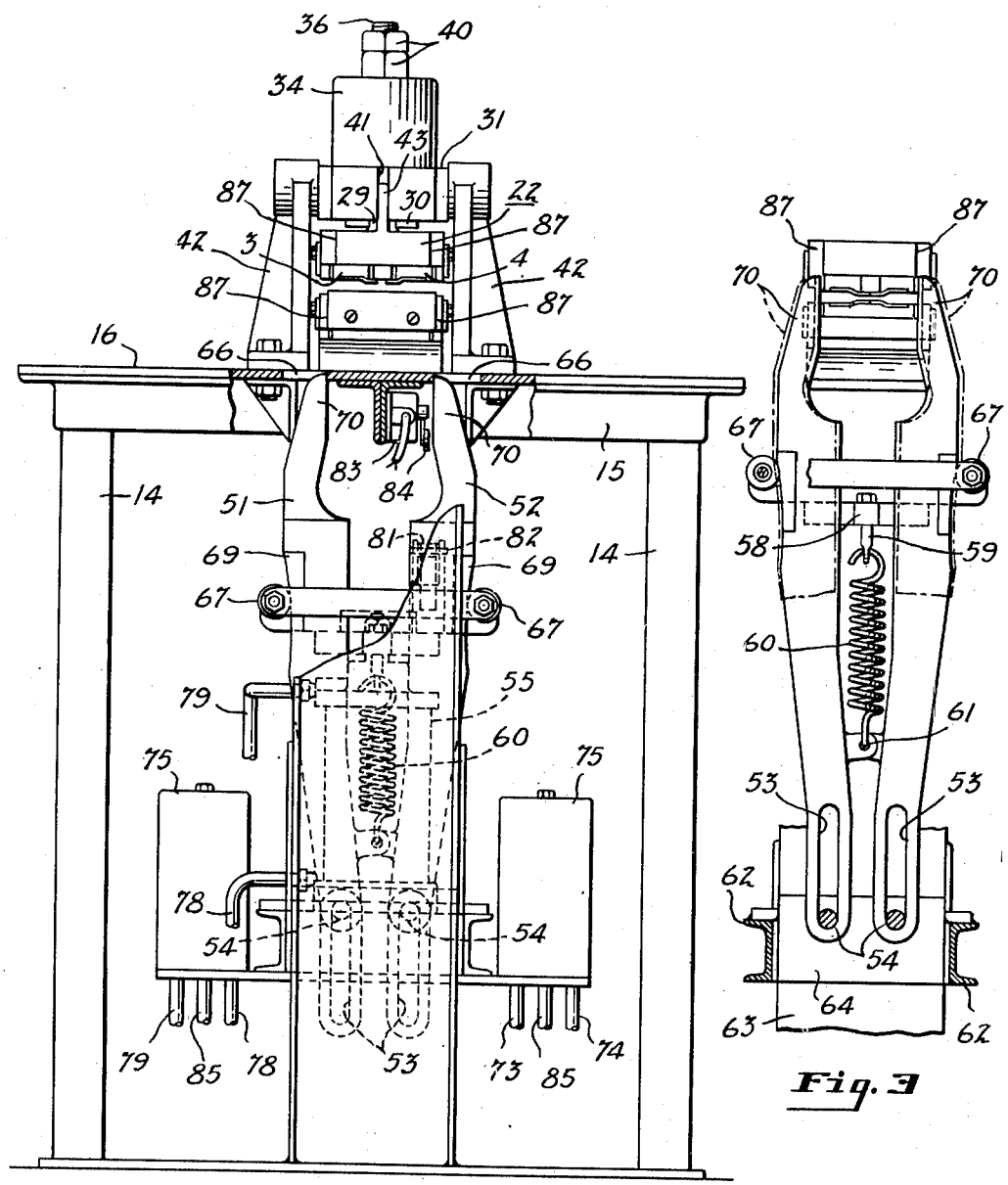

Nov. 29, 1949  I. J. REMARK  2,489,324
SPLICING APPARATUS

Filed Aug. 13, 1948  4 Sheets-Sheet 3

INVENTOR
*Isidore J. Remark*
BY
*Evans & McCoy*
ATTORNEYS

Nov. 29, 1949     I. J. REMARK     2,489,324
SPLICING APPARATUS

Filed Aug. 13, 1948     4 Sheets-Sheet 4

INVENTOR
*Isidore J. Remark*
BY
*Evans + McCoy*
ATTORNEYS

Patented Nov. 29, 1949

2,489,324

UNITED STATES PATENT OFFICE 2,489,324

SPLICING APPARATUS

Isidore J. Remark, Akron, Ohio, assignor to The General Tire and Rubber Company, Akron, Ohio, a corporation of Ohio Application August 13, 1948, Serial No. 44,120

20 Claims. (Cl. 154—9)

This invention relates to splicing apparatus for joining vulcanizable material such as the ends of raw or partially cured rubber tubes used in the manufacture of vehicle tire inner tubes. The invention is useful, however, in connection with the splicing of other articles.

The splicing of rubber articles, both natural and synthetic, has previously been studied and apparatus suitable therefor is disclosed in U. S. Patent 2,254,596 and in co-pending applications for U. S. patent, Serial No. 692,468, filed August 23, 1946, for Method and apparatus for splicing inner tubes, and Serial No. 768,215, filed August 12, 1947, for Tube splicer. The present application is directed principally to improvements on the earlier splicers of the applications and patent referred to.

It is one of the principal objects of the present invention to improve the operating characteristics of splicers, particularly the manner in which the stock grippers are moved together to engage and then to compress the abutted ends of the stock during the splicing operation.

Another object is to provide, in a splicer having a movable platen, improved mounting means for such platen which provide for both tilting and rectilinear bodily movement. More specifically, it is sought to provide a splicer construction in which a platen carrying relatively movable stock grippers is mounted for tilting and rectilinear movement on a supporting member and the supporting member is mounted for pivotal movement on the frame or supporting structure of the apparatus.

The foregoing and other objectives are realized in the present splicer which has fluid operated means for actuating the platens that carry the stock engaging grippers. The use of fluid actuated means permits the apparatus to operate with a variable time-movement cycle depending upon the physical characteristics of the stock being joined. Thus a relatively soft rubber stock yields quickly to gripper and platen pressure applied by fluid actuated means, whereas a relatively hard stock, being more resistant to deformation, resists the compressive forces applied thereto and the splicing operation progresses at a slower or different rate than in the case of the soft stock. This variation in the time-movement cycle takes place automatically and, without attention or adjustment of the apparatus on the part of the operator, may vary as between successive splicing operations.

Fluid actuated means is also employed to raise the gripper contracting or clamping arms into position and to move such arms together for the purpose of bearing against the stock grippers and compressing the stock in the splicing operation. As a preferential arrangement both the raising of the clamping arms and the moving of the clamping arms against the stock grippers are effectuated by common fluid actuated means. The arm raising and arm clamping movements are made to take place sequentially, rather than simultaneously, by suitable lost motion means associated with the arm mounting structure.

Other objects and advantages relating to certain details of construction and arrangements of parts are apparent in the following detailed description of a preferred embodiment of the invention. This description is made in connection with the accompanying drawings forming part of the specification. Like parts throughout the several views are indicated by the same letters and numerals of reference. In the drawings:

Fig. 2 is a front elevational view, partly in section and with parts broken away and removed, full lines showing the splicer open and broken lines showing the splicer closed;

Fig. 3 is a fragmentary elevational detail, partly in section and partly diagrammatic, showing the gripper clamping arms and related parts raised and at one limit of movement in a splicing operation;

Figure 1:
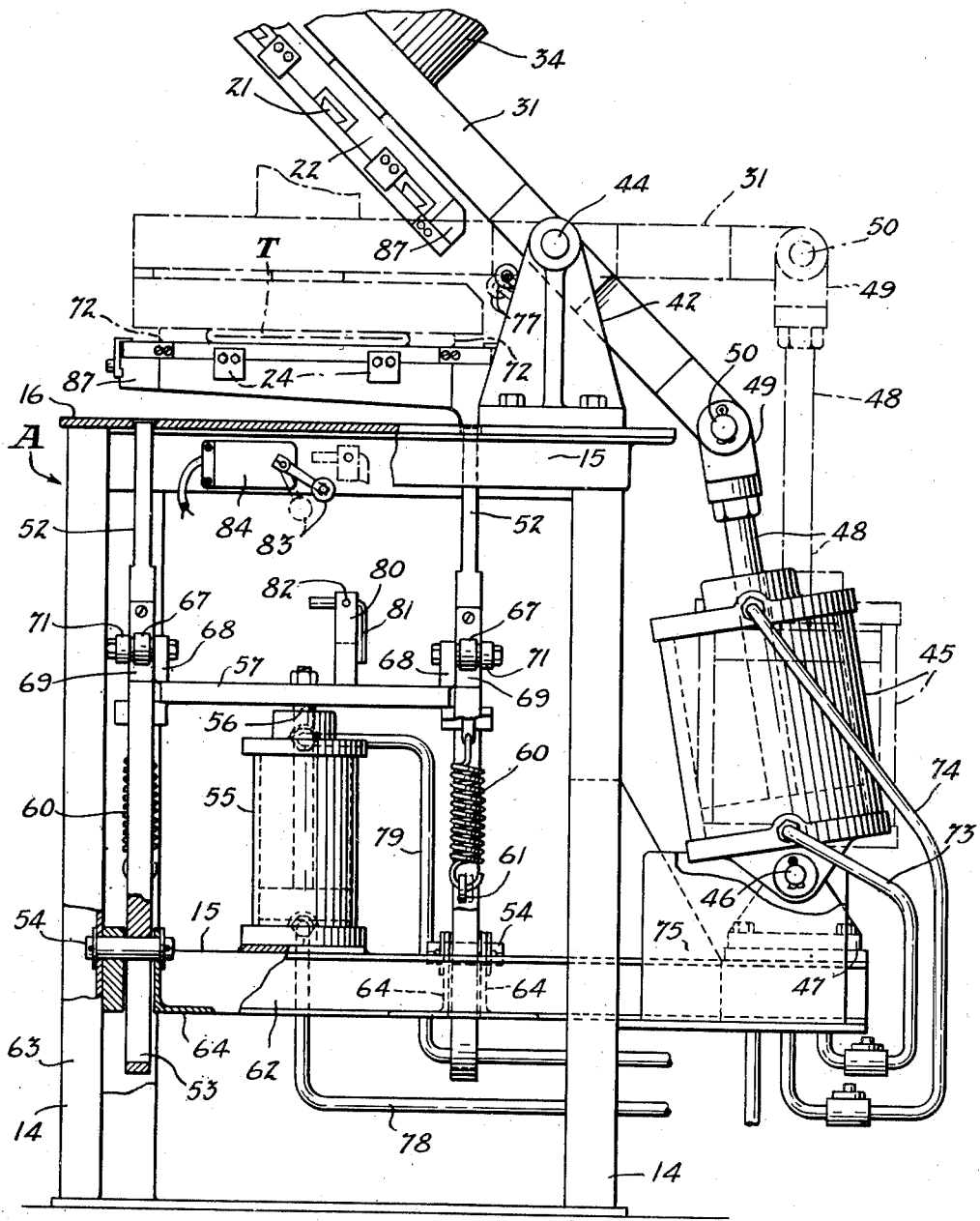
Figure 1 is a side elevational view of the splicer, partly in section and with parts broken away and removed.
Figure 4:
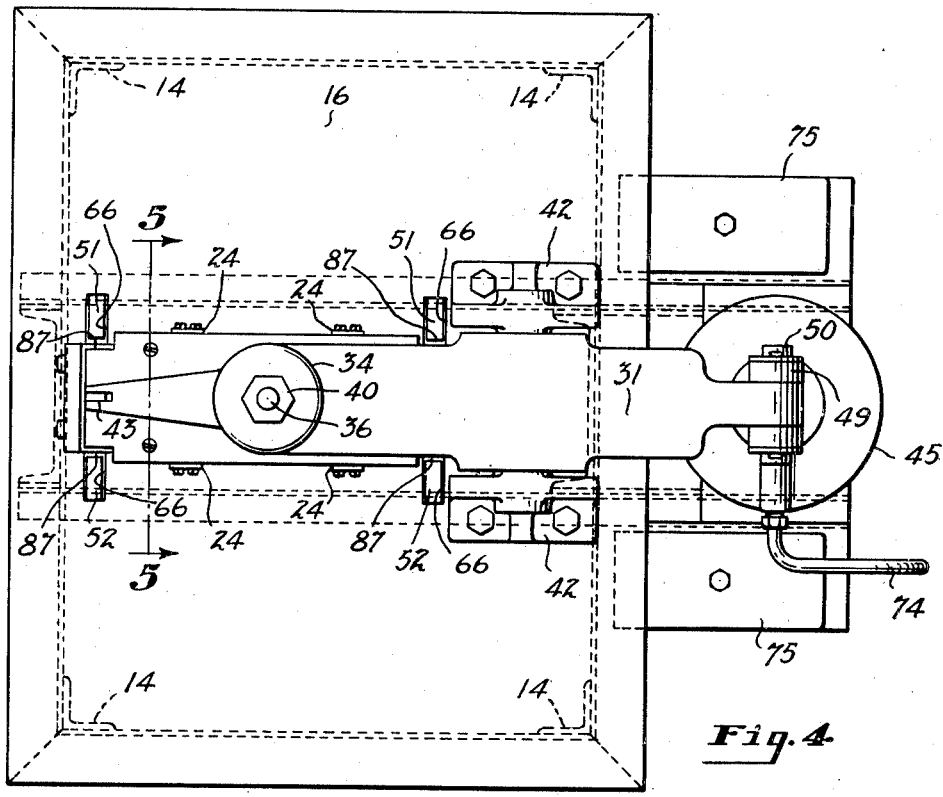
Fig. 4 is a top or plan view of the splicer, with parts removed.
Figure 5:
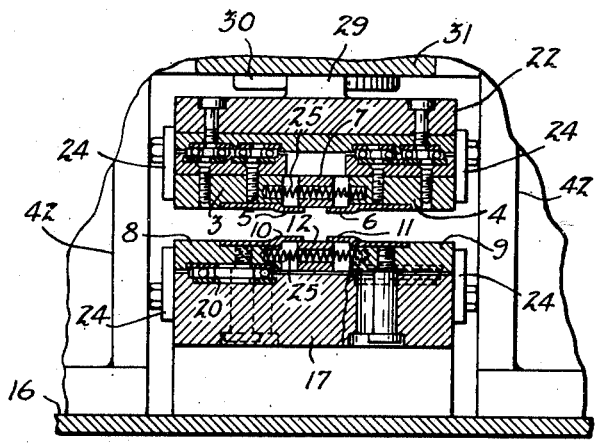
Fig. 5 is a fragmentary sectional detail taken substantially on the line indicated at 5—5 of Fig. 4 and enlarged with respect to that figure.
Figure 6:
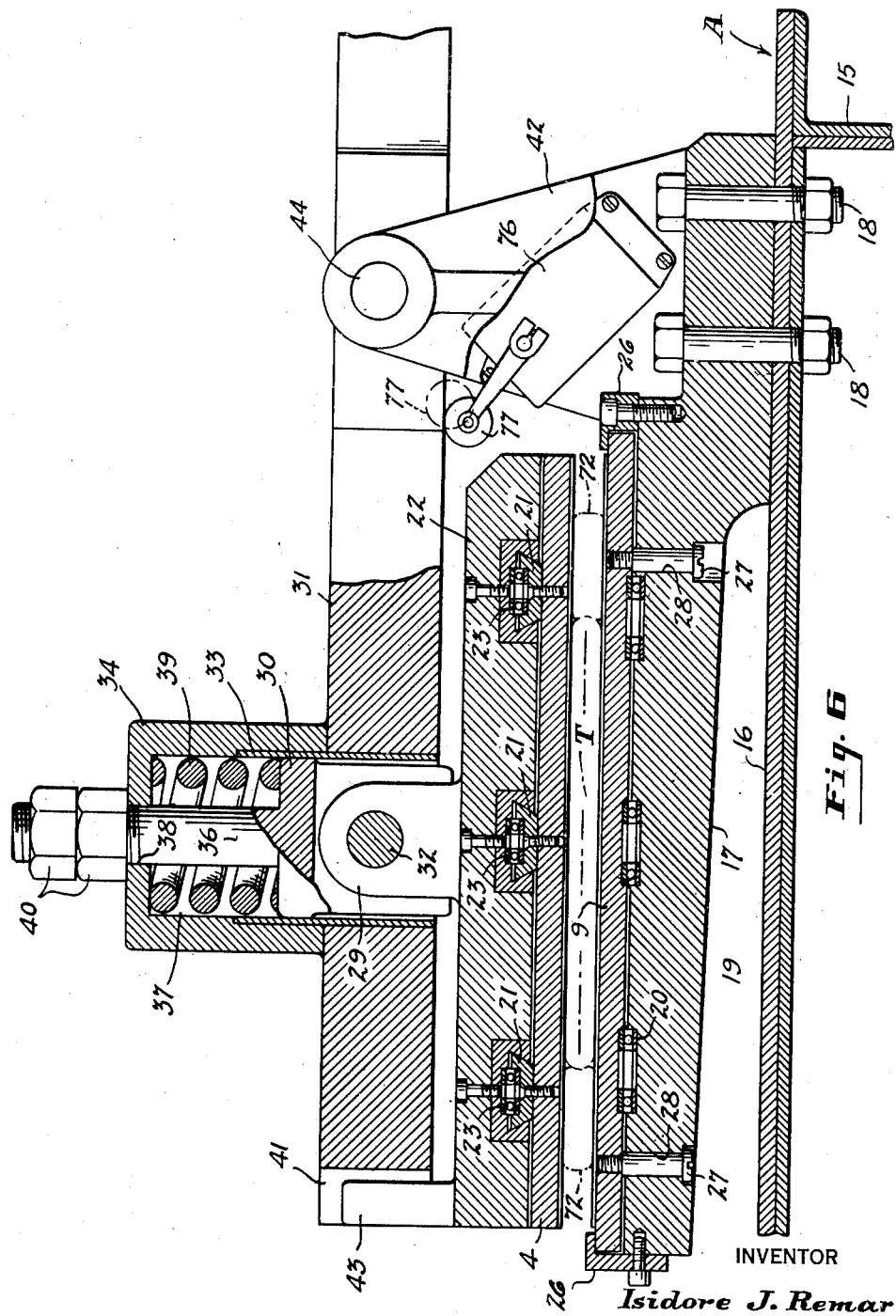
Fig. 6 is a sectional detail with parts broken away and removed, taken longitudinally through the platens and stock grippers, this view being on an enlarged scale with respect to the other figures.

The methods and procedures employed in operating the present apparatus correspond in general to those set forth in the patent and applications referred to above. The rubber tube or article to be spliced is first flattened and cut transversely to provide clean, square ends which are placed in abutment. The freshly cut ends adhere together sufficiently for handling by reason of their tacky condition. The splicing operation is then completed in the present apparatus. The abutted and adhering ends of tube T, indicated diagrammatically, are placed between a pair of upper gripper members or bars 3 and 4, and lower gripper bars or members 8 and 9. The gripper pairs have thin flanges 5 and 6 and 10 and 11, respectively, projecting toward one another from their opposing edges. Gap closing bars 7 and 12 are disposed respectively between the grippers of the upper and lower pairs.

The apparatus includes a suitable supporting structure A having legs 14, cross frame members 15 and a substantially horizontal work table or top 16. The lower gripper bars 5 and 6 are mounted on a fixed or lower anvil platen 17 secured to the supporting structure as by bolts 18. This platen is of cantilever construction providing an under clearance 19 between the platen and the table top 16, the clearance space being open at one end of the platen for receiving the body of the inner tube or other annular article being spliced. Roller bearings 20 or other antifriction means are interposed between the lower gripper bars or members 8 and 9 and the lower platen 17 to permit the gripper members to be moved easily toward and away from one another under load. The bearings 20 may be recessed into the upper flat face of the lower platen and wear plates may be recessed in the under surface of the gripper bars as shown.

The upper gripper bars 3 and 4 are suspended by dovetail slides 21 received in an upper or movable platen 22, the gripper bars being disposed against the bottom side of the platen. The guideways for receiving the dovetails 21 may be formed in the upper platen or may be milled into hardened inserts as shown. Suitable antifriction means such as ball bearings 23 may be interposed between the dovetails and the guides to facilitate movement of the gripper bars or members toward and away from one another when under load. Along the sides of the platens are secured retainers 26 which project across the edges of the gripper bars to limit the movement of the latter and prevent the grippers from riding laterally off the platens. Front and rear slides or gibs 26 are secured on the anvil platen 17 at the ends of the lower grippers and serve as retainers and safety guards. Helical coil compression springs 25 are interposed under compression between each pair of the gripper members to normally urge the gripper members apart. Desirably these springs may extend through apertures provided therefor in the gap closing blocks 7 and 12, the springs having running fits in the blocks. The ends of the springs may be received in recesses or sockets provided therefor in the adjacent edges of the stock grippers.

Movement of the lower stock gripping members 5 and 6 is limited laterally by shoulder bolts 27 which extend through slots 28 in the lower platen 17. The slots are elongated transversely of the platen to permit limited movement of the gripping members toward and away from one another. Cut-outs or recesses 87 are formed in the sides of both the top and bottom platens. These recesses accommodate jaw ends 70 of clamping arms 51 and 52 so that the clamping arms can be operated to squeeze the grippers together, as will later appear.

The upper platen 22 is formed centrally with an upstanding boss 29 received in the clevis or bifurcated end of a piston or slide 30 movably mounted in a supporting member 31. The platen boss 29 receives a pin 32 carried in the clevis end of the piston slide so that the platen is tiltably mounted relative to the supporting member 31. The piston 30 is guided in a cylindrical bearing sleeve 33 retained as by a press fit in a circular opening in the supporting member and in a hollow circular sectioned cylinder 34 secured as by welding to the upper face of the supporting member 31. A rod 36, integral with or secured to the upper end of the piston slide 30, extends upwardly through cylinder chamber 37 and has a running fit through a central opening 38 formed in the otherwise closed upper end of the cylinder. A helical coil compression spring 39 is disposed in the cylinder chamber 37 about the rod 36 and between the piston slide and the upper end of the cylinder, this spring acting to urge the slide downwardly, and to yieldingly resist upward movement of the piston and the platen 22 relative to the supporting member 31. The upper end of the rod 36 is threaded to receive adjusting lock nuts 40 which bear against the top of the cylinder 34. These nuts are used to raise or lower the piston relative to the supporting member 31.

At one or the outer end of the supporting member or arm 31 a vertical slot 41 receives an upstanding finger 43 formed on or secured to one end of the platen 22. The finger has a running fit in the slot permitting tilting and bodily movement of the platen relative to the supporting member 31 while limiting or resisting relative turning of the platen on the supporting member about the axis of the piston 30 and the rod 36.

The supporting member 31 and the upper platen carried thereby are mounted for tilting or swinging movement on the supporting structure A so as to carry the upper platen and the stock grippers mounted thereon toward and away from the lower or stationary platen and its stock grippers. A pair of spaced pedestals 42 are bolted to the top 16 of the supporting structure adjacent the rear of the latter and are formed at their upper ends with aligned journals which receive oppositely directed pivot pins 44 extending from the sides of the supporting member 31 intermediate the ends of the latter. Rocking or tilting movement imparted to the supporting member 31 thus swings the upper platen 22 and the grippers 3 and 4 carried thereby toward and away from the lower platen 17 and the grippers 8 and 9. Actuation of the supporting member 31 is by suitable fluid operated means such as an air or pneumatic cylinder assembly 45. The cylinder or body of this assembly has closed ends and is supported by means of a bracket which is pivotally mounted on a pin 46 carried by a fixed bracket 47 on a plate supported by extension cross members 62 of the supporting structure. The movable piston of the pneumatic cylinder assembly is connected by rod 48, which extends upwardly through a stuffing box in the upper end of the cylinder, to the other or rear end of the supporting arm member 31. A clevis end 49 on the piston rod receives a pin 50 in the end of the supporting member. The connection of the actuator to the arm is remote from the piston cup 34 and on the opposite side of the fulcrum pins 44 therefrom. Thus the means for actuating the upper platen is connected to the supporting member 31 on one side of the pivot axis of the supporting member, while the platen is connected to the supporting member on the other side of its pivot axis.

Disposed below the table top 16 are front and rear pairs of clamping arms 51 and 52. The lower ends of the arms are formed with elongated slots 53 which receive horizontal pins 54 carried by a supplemental frame structure. This supplemental structure includes extension cross members 62 secured in spaced parallel relation against the flanges of vertical channel members 63. Auxiliary cross plate or angle elements 64 extending between and secured to the extension cross members 62 are apertured to receive the pins 54. The slots 53 provide for limited vertical travel of the clamping arms in combination with pivotal or tilting movement of the arms toward and away from one another in the gripper clamping operation.

Actuation of the arms is effected through suitable pneumatic or other fluid operated means such as a piston and cylinder assembly 55. This assembly is common to both front and rear pairs of the clamping arms. Rod 56 of the assembly extends through a stuffing box in the upper end of the assembly and has a cross head or actuator member 57 secured thereon. The ends of the cross head are formed with finger portions 58 which extend between the coupled pairs of clamping arms and carry vertically disposed adjusting screws 59. The lower ends of these screws are formed with eyes which receive the upper ends of helical coil tension springs 60. The lower ends of the springs are connected in the aligned eyes of overlapped fingers 61 extending inwardly toward one another from the pivoted clamping arms 51 and 52.

Upon upward movement of the piston rod 56, raising the cross head 57, the springs 60 are tensioned and simultaneously exert yielding lifting forces on the spaced pairs of clamping arms. Thus the clamping arms are raised in unison, the upper ends thereof moving upwardly through slots 66 provided therefor in the table top 16.

During such upward movement of the clamping arms the lower ends of such arms ride on and are guided by the stationary pins 54 in the arm slots 53. When the pins seat in the lower ends of the slots the upward travel of the clamping arms is arrested and continued movement of the actuator or cross head 57 under the action of the pneumatic cylinder assembly 55 is ineffective to lift the clamping arms beyond their upper limit of movement so determined. But such continued movement of the cross head operates to draw the clamping arms together in the following manner. Cam rollers 67 are mounted on the ends of cross elements 68 secured on the ends of the cross head 57. These rollers are disposed to ride over and bear against hardened metal cam inserts 69 secured along the outer edges of the clamping arms 51 and 52. The clamping arms are preferably received and guided between the cross elements 68 and companion pieces 71 which latter are carried on the pins supporting the cam roller 67. The spacing between each pair of cam rollers is such that when the clamping arms 51 and 52 are in their withdrawn or lower position, shown in Fig. 2, the distance between jaws 70 on the upper ends of the clamping arms is greateer than the width of the platens at the notched out portions 87 and also greater than the distance across the upper and lower pairs of gripper members. Thus in the movement upward of the clamping arms the jaws 70 clear the platens and grippers as shown by the broken lines of Fig. 3.

The pressure faces of the cam inserts 69 slope outwardly or away from one another so that after the clamping arms have reached the limit of their upward travel the continued upward movement of the cam rollers 67 is relative to the clamping arms and has the effect of drawing together the clamping arms jaws 70 to the position shown approximately by the full lines of Fig. 3. This drawing together of the clamping arms squeezes together the gripper bars between the jaws of the arms and applies endwise pressure to the abutted stock ends being spliced.

In initial assembly, or subsequently by means of the adjusting screw 59, the springs 60 are tensioned so as to exert continuously an upward lifting force on the lever fingers 61, even when the clamping arms 51 and 52 are at their lower limit of movement in the withdrawn position of Figs. 1 and 2. The upward lifting force thus exerted on each pair of the lever fingers 61 by the spring 60 acts along a line which is offset or spaced inwardly from the axes of the pivot pins 54 and provides turning couples which tend to spread apart or open the clamping arms 51 and 52 and to swing the clamping arms away from one another to retracted positions against the cam rollers 67. Thus the cam inserts 69 are held in continuous engagement with the cam rollers 67 and smooth, quiet operation results.

In splicing the tube T the operator positions the adhering abutted ends on the lower grippers 8 and 9 with the line of abutment above and parallel to the gap closing bar 12. The platens are open as shown in Fig. 1. Confining pads 72 of rubber or similar material are placed against the side edges of the tube stock T. Through suitable controls the pneumatic system is then operated to introduce high pressure air or other fluid into the lower end of the cylinder assembly 45 as through a flexible conduit 73. The high pressure fluid forces the piston within the cylinder to move upwardly, raising the rod 48 and causing the arm or supporting member 31 to pivot on the pin 44 in a counterclockwise direction from the full lines of Fig. 1 to the broken lines of that figure. This closes the platens and distended grippers on the tube T. During this initial or platen closing movement, fluid is discharged from the space above the piston in the cylinder assembly 45 through a flexible conduit 74 connected to the top of the assembly. The controls governing the introduction and exhaust of high pressure fluid from the cylinder assembly may include conventional four-way valves mounted as in one of the boxes 75 supported on a plate secured against the underside of the projecting ends of the extension cross members 62.

The splicing cycle is governed by conventional means to determine the time interval during which the platens are held in closed position. The control circuit may include a limit switch 76 secured to the inside of one of the pedestals 42. This switch has a movable arm which carries a roller 77 engaged by the arm or supporting member 31 when the latter is lowered to operating position. The switch is thus actuated to energize the electrical time control circuit which governs the operation of the machine.

As soon as the pressure platens are closed, the control functions to introduce high pressure fluid into the lower end of the cylinder assembly 55 through a conduit 78. This introduction of high pressure fluid into the clamping arm cylinder assembly is governed automatically by the electrical control circuit in response to the limit switch 76. The resulting upward movement of the piston exhausts fluid from the cylinder space above the piston through a conduit 79 connected to the upper end of the cylinder. The upward movement imparted to the cross head 57 by the piston rod 56 operates, as previously described, first, to lift the clamping arms 51 and 52 through the table apertures 66, and second, to contract the jaws 70 against the side edges of the upper and lower pairs of grippers. This movement of the clamping arms from retracted to closed positions simultaneously squeezes together both upper and lower pairs of grippers which are held strongly against opposite sides of the tube by the fluid pressure in the cylinder 45.

Fluid pressure is retained below the pistons in both cylinder assemblies for a predetermined time interval as governed by the conventional time delay electrical control circuit.

When the electrical control actuates the fluid valves to admit high pressure fluid above the pistons of the cylinder assemblies through the conduits 74 and 79 the fluid below the pistons is exhausted through the conduits 73 and 78. The introduction of high pressure fluid above the piston of the cylinder assembly 45 tilts the supporting arm or member 31 in a clockwise direction as viewed in Fig. 1 to raise the movable platen to approximately the position shown by the full lines of that figure. The spliced tube is then removed from the apparatus and vulcanized.

On the top of the cross head 57 an angle shaped finger 81 is pivoted adjacent its bend on bracket 80 by a pin 82. As the cross head moves downwardly the projecting end of the finger 81 engages roller 83 of a limit switch 84 secured to the supporting structure beneath the table top 16. The limit switch 84 is connected in the electrical control circuit to interrupt the current through relay holding coils and reset the control for operation of the apparatus in accordance with the predetermined cycle.

In accordance with the patent statutes the principles of the present invention may be utilized in various ways, numerous modifications and alterations being contemplated, substitution of parts and changes in construction being resorted to as desired, it being understood that the apparatus shown in the drawings and described above is given merely for purposes of explanation and illustration without intending to limit the scope of the claims to the specific details disclosed.

What we claim and desire to secure by United States Letters Patent is:

1. In a splicer having a movable stock gripper and a clamping arm for actuating the gripper, the arm being mounted for bodily shifting movement between a withdrawn position and an operating position in which the end of the arm is adjacent the gripper and the arm also being mounted for swinging movement between a retracted position and a closed position in which latter movement the arm bears against the gripper to move the latter in a splicing operation, the improvement which comprises an actuator and means for moving the actuator over a substantially rectilinear path, means interconnecting the arm and the actuator for simultaneous movement during travel of the actuator over a portion of said path to shift the arm to said operating position, and other means interconnecting the arm and the actuator to swing the arm to bear against the gripper during travel of the actuator over a succeeding portion of said path.

2. In a splicer having a movable stock gripper and a clamping arm for actuating the gripper, the arm being mounted for bodily shifting movement between a withdrawn position and an operating position in which the end of the arm is adjacent the gripper and the arm also being mounted for swinging movement between a retracted position and a closed position in which latter movement the arm bears against the gripper to move the latter in a splicing operation, the improvement which comprises an actuator and means for moving the actuator over a substantially rectilinear path, resilient means interconnecting the arm and the actuator for simultaneous movement during travel of the actuator over a portion of said path to shift the arm to said operating position, and cam means interconnecting the arm and the actuator to swing the arm to bear against the gripper during travel of the actuator over a succeeding portion of said path.

3. In a splicer having a movable stock gripper and a clamping arm for actuating the gripper, the arm being mounted for bodily shifting movement between a withdrawn position and an operating position in which the end of the arm is adjacent the gripper and the arm also being mounted for swinging movement between a retracted position and a closed position in which latter movement the arm bears against the gripper to move the latter in a splicing operation, the improvement which comprises an actuator and means for moving the actuator over a substantially rectilinear path, resilient means interconnecting the arm and the actuator for simultaneous movement during travel of the actuator over a portion of said path to shift the arm to said operating position, and cam means interconnecting the arm and the actuator to swing the arm to bear against the gripper during travel of the actuator over a succeeding portion of said path, the resilient connecting means being attached to the arm so as to act along a line providing a turning moment about the swing axis of the arm to thereby yieldingly hold the arm in retracted position.

4. In a splicer having a movable stock gripper and a clamping arm for actuating the gripper, the arm being mounted for bodily shifting movement between a withdrawn position and an operating position in which the end of the arm is adjacent the gripper and the arm also being mounted for swinging movement between a retracted position and a closed position in which latter movement the arm bears against the gripper to move the latter in a splicing operation, the improvement which comprises an actuator and means for moving the actuator over a substantially rectilinear path, means interconnecting the arm and the actuator for simultaneous movement during travel of the actuator in one direction over a portion of said path to shift the arm to said operating position, and means interconnecting the arm and the actuator to swing the arm to bear against the gripper during travel of the actuator in the same direction over a succeeding portion of said path.

5. In a splicer having a movable stock gripper and a clamping arm for actuating the gripper, the arm being mounted for bodily shifting movement between a withdrawn position and an operating position in which the end of the arm is adjacent the gripper and the arm also being mounted for swinging movement between a retracted position and a closed position in which latter movement the arm bears against the gripper to move the latter in a splicing operation, the improvement which comprises an actuator and means for moving the actuator over a substantially rectilinear path, means interconnecting the arm and the actuator for simultaneous movement during travel of the actuator in one direction over a portion of said path to shift the arm to said operating position, and means interconnecting the arm and the actuator to swing the arm to bear against the gripper during travel of the actuator in the same direction over a succeeding portion of said path, said interconnecting means being arranged, upon movement of the actuator in a reverse direction, to first retract the arm from said closed position and to then withdraw the arm from the operating position.

6. In a splicer having a movable stock gripper and a clamping arm for actuating the gripper, mounting means having connection with one end of the arm both for lost motion arm movement for bodily shifting of the arm between a withdrawn position and an operating position in which the other end of the arm is adjacent the gripper and for pivotal arm movement between a retracted position and a closed position in which latter movement the arm bears against the gripper to move the latter in a splicing operation, an actuator and means for moving the actuator over a substantially rectilinear path, means interconnecting the arm and the actuator for simultaneous movement during travel of the actuator over a portion of said path to shift the arm through the lost motion movement to said operating position and to pivot the arm to bear against the gripper during travel of the actuator over a succeeding portion of said path.

7. In a splicer having a movable stock gripper and a clamping arm for actuating the gripper, the arm being mounted for bodily shifting movement between a withdrawn position and an operating position in which the end of the arm is adjacent the gripper and the arm also being mounted for swinging movement between a retracted position and a closed position in which latter movement the arm bears against the gripper to move the latter in a splicing operation, the improvement which comprises fluid operated actuator means movable over a substantially rectilinear path, and means connecting the actuator to the arm for shifting the arm to the operating position during travel of the actuator over one portion of its path and for swinging the arm to bear against the gripper during travel of the actuator over another portion of its path.

8. In splicing apparatus having stock gripping members mounted for relative movement toward and away from one another and a pair of actuating arms mounted both for bodily shifting movement to and from an operating position in which the ends of the arms are adjacent the gripping members and for swinging movement toward and away from one another to bear against the gripping members, the improvement which comprises fluid actuated means having connection with the arms and arranged for operation in one direction to first shift the arms bodily to said operating position and to then swing the arms to bear against the gripping members and thereby move the gripping members toward one another in a splicing operation.

9. In splicing apparatus having stock gripping members mounted for relative movement toward and away from one another and a pair of actuating arms mounted both for bodily shifting movement to and from an operating position in which the ends of the arms are adjacent the gripping members and for swinging movement toward and away from one another to bear against the gripping members, the improvement which comprises fluid actuated means having connection with the arms and arranged for operation in one direction to first shift the arms bodily to said operating position and to then swing the arms to bear against the gripping members and thereby move the gripping members toward one another in a splicing operation, said fluid actuated means being further arranged for operation in a reverse direction to first swing the arms apart to release the gripping members and to then shift the arms bodily away from said operating position.

10. In splicing apparatus comprising confronting platens mounted for movement toward and away from one another, pairs of stock gripping members mounted on opposed faces of the platens, the gripping members of each pair being relatively movable toward and away from one another, and a pair of clamping arms and means mounting the arms for movement toward and away from one another to bear against the stock gripping members and move the gripping members together, the improvement which comprises fluid actuated means having connection with the arms and operative in one direction for moving the arms to bear against the gripping members and move the gripping members together in a splicing operation and operative in a reverse direction for retracting the arms from the gripping members.

11. In a splicer having a supporting structure and a pair of relatively movable platens for receiving stock therebetween and gripping the received stock, mounting means for one of the platens comprising an elongated supporting member, an attaching element and means mounting the element on the supporting member for bodily movement relative to the supporting member, means pivotally securing the one platen to the attaching element, and means mounting the supporting member on the structure for movement carrying the one platen toward and away from the other platen.

12. In a splicer having a supporting structure and a pair of relatively movable platens for receiving stock therebetween and gripping the received stock, mounting means for one of the platens comprising an elongated supporting member, an attaching element and means mounting the element on the supporting member for bodily movement relative to the supporting member, means pivotally securing the one platen to the attaching element, means mounting the supporting member on the structure for movement carrying the one platen toward and away from the other platen, and means interlocking said one platen and the supporting member to limit the relative movement of such platen and the supporting member.

13. In a splicer having a supporting structure and a pair of relatively movable platens for receiving stock therebetween and gripping the received stock, mounting means for one of the platens comprising an elongated supporting member, an attaching element and means mounting the element on the supporting member for bodily movement relative to the supporting member, resilient means resisting said relative movement, means pivotally securing the one platen to the attaching element, and means mounting the supporting member on the structure for movement carrying the one platen toward and away from the other platen.

14. In a splicer having a supporting structure and a movable stock clamping platen, mounting means for the platen comprising a supporting member and means mounting the supporting member on the structure for pivotal movement, an attaching element and means mounting the element on the supporting member remote from the pivot axis of the latter for bodily movement relative to the supporting member, and means pivotally securing the platen to the attaching element whereby the platen is capable of simultaneous pivotal movement with the supporting member, bodily movement with the attaching element, and pivotal movement on the attaching element.

15. In a splicer having a supporting structure and a movable stock clamping platen, mounting means for the platen comprising a supporting member and means mounting the supporting member on the structure for pivotal movement, an attaching element and means mounting the element on the supporting member remote from the pivot axis of the latter for bodily movement relative to the supporting member, and means pivotally securing the platen to the attaching element for tilting movement about an axis parallel to the pivot axis of the supporting member, whereby the platen is capable of simultaneous pivotal movement with the supporting member, bodily movement with the attaching element, and pivotal movement on the attaching element.

16. In a splicer having a supporting structure and a movable stock clamping platen, mounting means for the platen comprising a supporting member and means mounting the supporting member on the structure for pivotal movement, an attaching element and means mounting the element on the supporting member remote from the pivot axis of the latter for bodily movement relative to the supporting member, resilient means associated with the attaching element mounting means to yieldingly resist said relative bodily movement of the element, and means pivotally securing the platen to the attaching element whereby the platen is capable of simultaneous pivotal movement with the supporting member, bodily movement with the attaching element, and pivotal movement on the attaching element.

17. In a splicer having a supporting structure and a movable stock clamping platen, mounting means for the platen comprising a supporting member and means mounting the supporting member on the structure for pivotal movement, an attaching element and means mounting the element on the supporting member remote from the pivot axis of the latter for bodily movement relative to the supporting member, means pivotally securing the platen to the attaching element whereby the platen is capable of simultaneous pivotal movement with the supporting member, bodily movement with the attaching element, and pivotal movement on the attaching element, and means interlocking the platen and the supporting member to limit the turning movement of the platen.

18. In a splicer having a supporting structure and a movable stock clamping platen, mounting means for the platen comprising a supporting member and means mounting the supporting member on the structure for pivotal movement about an axis intermediate its ends, an attaching element and means mounting the element on the supporting member on one side of the pivot axis for bodily movement relative to the supporting member, means pivotally securing the platen to the attaching element whereby the platen is capable of simultaneous pivotal movement with the supporting member, bodily movement with the attaching element, and pivotal movement on the attaching element, and actuating means having connection with the supporting member on the other side of the pivot axis for pivoting the supporting member.

19. In a splicer having a supporting structure and a pair of relatively movable platens for receiving stock therebetween and gripping the received stock, mounting means for one of the platens comprising an elongated supporting member, means fulcruming the supporting member on the structure for tilting movement about an axis intermediate the ends of the supporting member, means attaching said one platen to the supporting member on one side of the tilting axis, and fluid operated actuating means connected to the supporting member on the other side of said axis, the actuating means being operable to reciprocate the supporting member about the axis for swinging said one platen toward and away from the other platen, the attaching means including a pivotal connection for turning of the one platen relative to the supporting member about an axis substantially parallel to the tilting axis to provide substantially uniform distribution of pressure between the platens during the splicing operation.

20. In splicing apparatus comprising confronting platens mounted for movement toward and away from one another, pairs of stock gripping members mounted on opposed faces of the platens, the gripping members of each pair being relatively movable toward and away from one another, and a pair of clamping arms and means mounting the arms for bodily shifting movement in unison between withdrawn positions and operating positions in which the ends of the arms are adjacent the stock gripping members and for swinging movement between retracted positions and closed positions during which latter movement the arms bear against the stock gripping members to move the latter toward one another in a splicing operation, improved actuating means for the arms comprising a movable member and means for reciprocating such member over a substantially rectilinear path, resilient means connecting the movable member to the arms so that the arms are shifted in unison to the operating positions during movement of said member over one portion of said path, and cam means connecting the movable member to the arms so that the arms are swung in unison to said closed positions during movement of said member over another portion of said path.

ISIDORE J. REMARK.

REFERENCES CITED

The following references are of record in the file of this patent:

UNITED STATES PATENTS

| Number | Name | Date |
| --- | --- | --- |
| 2,024,578 | Haase | Dec. 17, 1935 |
| 2,186,286 | Engler et al. | Jan. 9, 1940 |
| 2,254,596 | Breth et al. | Sept. 2, 1941 |
| 2,272,881 | Stevens | Feb. 10, 1942 |
| 2,273,464 | Campbell et al. | Feb. 17, 1942 |